(12) United States Patent
Sakoda et al.

(10) Patent No.: US 8,248,027 B2
(45) Date of Patent: Aug. 21, 2012

(54) NON-CONTACT POWER TRANSMISSION APPARATUS

(75) Inventors: Shimpei Sakoda, Kariya (JP);
Kazuyoshi Takada, Kariya (JP);
Sadanori Suzuki, Kariya (JP); Kenichi Nakata, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 273 days.

(21) Appl. No.: 12/702,171

(22) Filed: Feb. 8, 2010

(65) Prior Publication Data

US 2010/0201204 A1 Aug. 12, 2010

(30) Foreign Application Priority Data

Feb. 9, 2009 (JP) ................. 2009-027676

(51) Int. Cl.
*H02J 7/00* (2006.01)
*H01F 27/42* (2006.01)
(52) U.S. Cl. ........................ 320/108; 307/104
(58) Field of Classification Search ................. 320/108; 307/104
See application file for complete search history.

(56) References Cited

U.S. PATENT DOCUMENTS

| | | | | |
|---|---|---|---|---|
| 6,072,300 A * | 6/2000 | Tsuji | ............................ | 320/116 |
| 6,972,543 B1 * | 12/2005 | Wells | ........................... | 320/108 |
| 7,211,986 B1 * | 5/2007 | Flowerdew et al. | .......... | 320/108 |
| 7,268,496 B2 * | 9/2007 | Takahashi et al. | ............ | 315/105 |
| 7,868,587 B2 * | 1/2011 | Stevens et al. | ................ | 320/108 |
| 2007/0222542 A1 | 9/2007 | Joannopoulos | | |
| 2008/0197713 A1 | 8/2008 | Jin | | |
| 2008/0278264 A1 | 11/2008 | Karalis | | |
| 2011/0049978 A1 * | 3/2011 | Sasaki et al. | ................... | 307/9.1 |

FOREIGN PATENT DOCUMENTS

| KR | 2008-0077573 A | 8/2008 |
|---|---|---|
| WO | WO2007/008646 A2 | 1/2007 |
| WO | WO2008/118178 A1 | 10/2008 |
| WO | WO2009/054221 A1 | 4/2009 |

OTHER PUBLICATIONS

"Wireless Power Transfer Via Strongly Coupled Magnetic Resonances" Science Magazine vol. 317, Jul. 6, 2007, p. 83-86.
Soljacic, et al., "*Nikkei Electronics*", Dec. 3, 2007, 966, 117-128.

* cited by examiner

*Primary Examiner* — M'Baye Diao
(74) *Attorney, Agent, or Firm* — Woodcock Washburn LLP

(57) ABSTRACT

A non-contact power transmission apparatus is disclosed. The non-contact power transmission apparatus includes an AC power source, a primary coil, a primary side resonance coil, a secondary side resonance coil, a secondary coil, a voltage measuring section, and a distance calculating section. AC voltage of the AC power source is applied to the primary coil. A load is connected to the secondary coil. The voltage measuring section measures the voltage of the primary coil. The distance calculating section calculates the distance between the primary side resonance coil and the secondary side resonance coil based on the voltage measured by the voltage measuring section.

9 Claims, 4 Drawing Sheets

NON-CONTACT POWER TRANSMISSION APPARATUS

CROSS REFERENCE TO RELATED APPLICATION

This application claims priority to Japanese Application No. 2009-027676 filed Feb. 9, 2009.

BACKGROUND

The present invention relates to a non-contact power transmission apparatus, and more particularly to a resonance type non-contact power transmission apparatus.

FIG. 9 schematically shows a resonance type non-contact power transmission apparatus that transmits power from a first copper wire coil 51 to a second copper wire coil 52 placed at a distance from the first copper wire coil 51 by means of resonance of electromagnetic fields. Such an apparatus is disclosed, for example, in NIKKEI ELECTRONICS published on Dec. 3, 2007, pages 117 to 128 and International Patent Publication No. WO/2007/008646. In FIG. 9, a magnetic field generated at a primary coil 54 connected to an AC power source 53 is enhanced by magnetic field resonance by the first and second copper wire coils 51, 52, so that electrical power is generated at a secondary coil 55 through electromagnetic induction of the enhanced magnetic field of the second copper wire coil 52. The generated power is then supplied to a load 56. It has been observed that a 60-watt electric lamp, as the load 56, can be lit when first and second copper wire coils 51, 52 having a diameter of 30 cm are separated by 2 m.

To efficiently supply output power of the AC power source 53 to the load 56 in this resonance type non-contact power transmission apparatus, it is necessary to supply power from the primary coil 54 to the first copper wire coil 51 on the transmission side at a resonance frequency of the first copper wire coil 51 on the transmission side and the second copper wire coil 52 on the reception side. However, the above cited documents only disclose summaries of non-contact power transmission apparatuses, but do not specifically show what should be done to obtain a non-contact power transmission apparatus that satisfies the requirements.

Also, to efficiently supply the output power of the AC power source 53 to the load 56 using the resonance type non-contact power transmission apparatus, it is necessary to supply the output power of the AC power source 53 to the resonance system (the first and second copper wire coils 51, 52 and the primary and secondary coils 54, 55). In a case where an AC voltage having a certain frequency is output from the AC power source 53 to transmit power to the load 56, the power transmission efficiency changes if the distance between the resonance coils, that is distance between the first and second copper wire coils 51, 52, is changed. Therefore, in a case of a non-contact power transmission apparatus used in a condition where the distance between the first copper wire coil 51 on the transmission side and the second copper wire coil 52 on the reception side can vary, for example, in a case where the second copper wire coil 52 on the reception side is mounted on a movable body such as a vehicle or a robot, power transmission needs to be carried out in a state where the movable body is stopped at a position where the distance between the resonance coils allows power transmission to be efficiently carried out. However, if a dedicated sensor is provided for measuring the distance between the resonance coils, the manufacture becomes troublesome and the size of the apparatus is increased, accordingly.

SUMMARY

Accordingly, it is an objective of the present invention to provide a non-contact power transmission apparatus that is capable of determining whether the distance between resonance coils is suitable for efficiently carrying out power transmission, without providing a dedicated sensor for measuring the distance between the resonance coils.

To achieve the foregoing objective and in accordance with one aspect of the present invention, a non-contact power transmission apparatus including an AC power source, a primary coil to which an AC voltage of the AC power source is applied, a primary side resonance coil, a secondary side resonance coil, a secondary coil to which a load is connected, a voltage measuring section that measures the voltage of the primary coil, and a distance calculating section is provided. The distance calculating section calculates the distance between the primary side resonance coil and the secondary side resonance coil based on the voltage measured by the voltage measuring section.

In accordance with another objective of the present invention, a non-contact power transmission apparatus including an AC power source, a primary coil to which an AC voltage of the AC power source is applied, a primary side resonance coil, a secondary side resonance coil, a secondary coil to which a load is connected, a voltage measuring section that measures the voltage of the primary coil, and a determining section is provided. The determining section determines the state of the load based on the voltage measured by the voltage measuring section.

The inventors of the present invention found out that there was a specific relationship between a voltage of a primary coil and the distance between a primary side resonance coil and a secondary side resonance coil, or an inter-resonance coil distance. Based on the finding, the inventors came to achieve the present invention. In the present description, "AC power source" refers to a power source that outputs an AC voltage.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF ILLUSTRATIVE EMBODIMENTS

A non-contact power transmission apparatus according to a first embodiment of the present invention will now be described with reference to FIGS. 1 to 5. The non-contact power transmission apparatus of the present embodiment is used in a system that contactlessly charges a secondary battery 24 mounted on a movable body.

Figure 1:
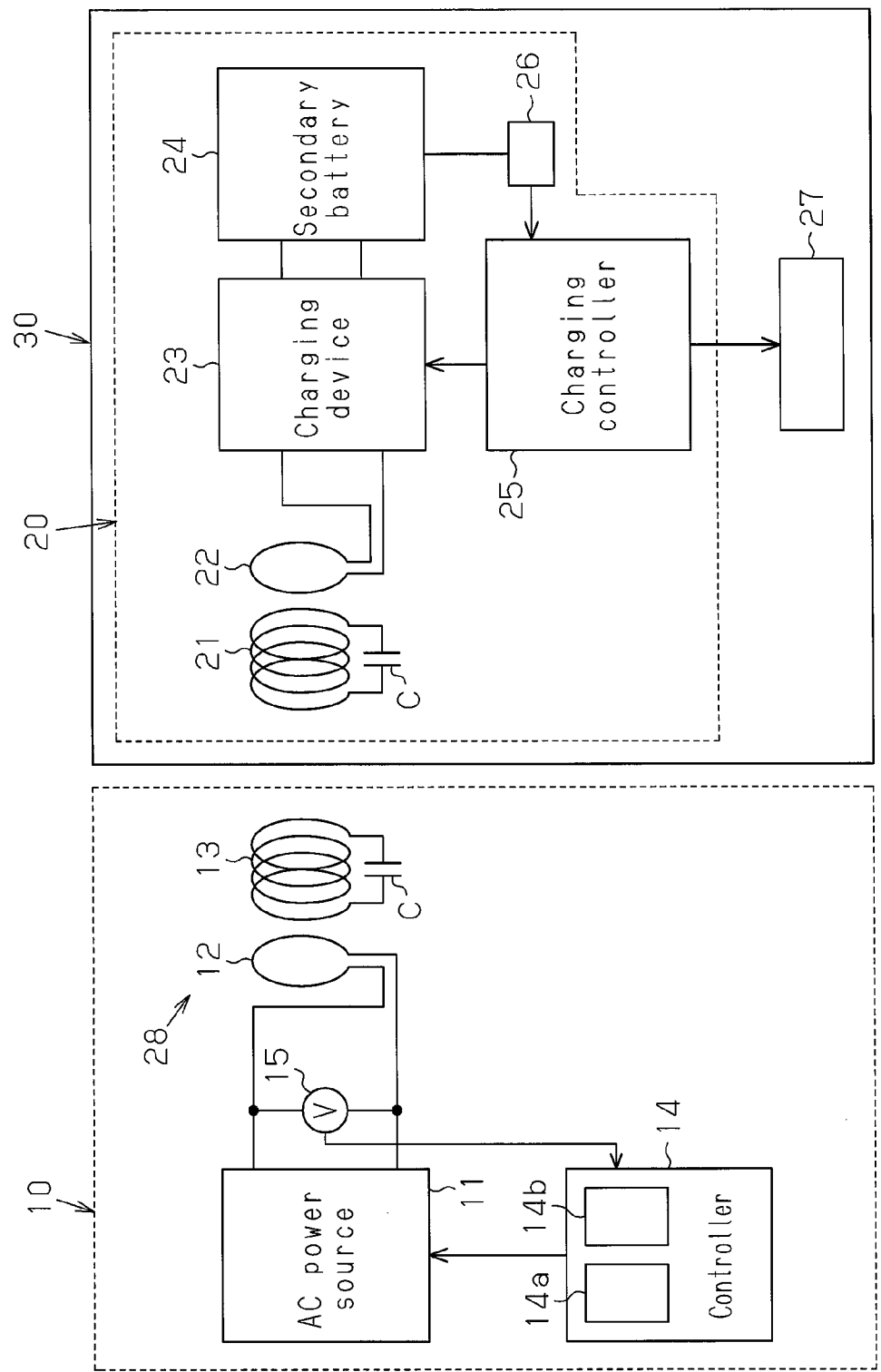
FIG. 1 is a diagram illustrating a non-contact power transmission apparatus according to a first embodiment of the present invention.

As shown in FIG. 1, the non-contact power transmission apparatus includes supply side equipment (transmission side equipment) 10 and reception side equipment 20. The supply side equipment 10 is installed in a charging station, and the reception side equipment 20 is mounted on a movable body, which is a vehicle 30.

The supply side equipment 10 includes an AC power source 11, a primary coil 12 to which an AC voltage output by the AC power source 11 is applied, a primary side resonance coil 13, and a supply side controller 14. The primary coil 12 and the primary side resonance coil 13 are arranged to be located on a common axis. A voltage sensor 15 is connected to the primary coil 12. The voltage sensor 15 serves as a voltage measuring section that measures the voltage at the ends of the primary coil 12. The detection signal output by the voltage sensor 15 is sent to the supply side controller 14. A capacitor C1 is connected to the primary side resonance coil 13. The AC power source 11 is a power source that outputs an AC voltage. The AC power source 11 is controlled by the supply side controller 14 so as to output an AC voltage of a specific frequency (resonance frequency).

The reception side equipment 20 includes a secondary side resonance coil 21, a secondary coil 22, a charging device 23 connected to the secondary coil 22, a secondary battery 24 connected to the charging device 23, and a charging controller 25. A capacitor C2 is connected to the secondary side resonance coil 21. The secondary side resonance coil 21 and the secondary coil 22 are arranged to be located on a common axis. Through electromagnetic induction of a magnetic field that is enhanced by magnetic field resonance by the primary side resonance coil 13 and the secondary side resonance coil 21, the secondary coil 22 supplies power generated in it to the charging device 23. The charging device 23 includes a rectifier circuit (not shown) that rectifies the AC voltage output by the secondary coil 22 to obtain a DC voltage, and a booster circuit (not shown) that raises the obtained DC voltage to a voltage suitable for charging the secondary battery 24. The charging controller 25 controls the switching elements of the booster circuit of the charging device 23 when the secondary battery 24 is charged. The charging device 23 and the secondary battery 24 form a load.

The vehicle 30 has a battery level sensor 26 that detects the remaining battery level of the secondary battery 24. The charging controller 25 receives a detection signal of the battery level sensor 26, and determines the charging state of the secondary battery 24 based on the received signal. The supply side controller 14 and the charging controller 25 can communicate with each other through a wireless communication device (not shown). The data of the remaining battery level of the secondary battery 24 detected by the battery level sensor 26 is sent to the supply side controller 14 through the wireless communication device. The vehicle 30 has an informing section 27 that informs of whether the primary side resonance coil 13 and the secondary side resonance coil 21 are in a proper positional relationship. As the informing section 27, for example, an LED that is lit when the primary side resonance coil 13 and the secondary side resonance coil 21 are in a proper positional relationship (for example, an LED that glows blue), and an LED that is lit when the primary side resonance coil 13 and the secondary side resonance coil 21 are not in a proper positional relationship (for example, an LED that glows red) may be used. The lighting of the LEDs is controlled by commands from the charging controller 25.

The primary coil 12, the primary side resonance coil 13, the secondary side resonance coil 21, the secondary coil 22, the charging device 23, and the secondary battery 24 form a resonance system 28. The resonance system 28 contactlessly transmits power from the AC power source 11 to the secondary battery 24. The primary coil 12, the primary side resonance coil 13, the secondary side resonance coil 21, and the secondary coil 22 are formed by electric wires. The electric wires forming the coils 12, 13, 21, 22 are, for example, wires coated with insulation vinyl. The diameter and the number of turns of each coil 12, 13, 21, 22 are suitably set in accordance with, for example, the intensity of the power to be transmitted. In the present embodiment, the primary coil 12, the primary side resonance coil 13, the secondary side resonance coil 21, and the secondary coil 22 are formed to have the same diameter. The specifications of the primary side resonance coil 13 and the secondary side resonance coil 21 are identical. The specifications of the capacitor C1 and the specifications of the capacitor C2 are identical.

The supply side controller 14 has a CPU 14a and a memory 14b. The memory 14b stores a control program for calculating the distance between the primary side resonance coil 13 and the secondary side resonance coil 21 (hereinafter referred to an inter-resonance coil distance) based on the voltage of the primary coil 12, that is, the voltage date detected by the voltage sensor 15. The supply side controller 14 forms a distance calculating section that calculates the inter-resonance coil distance based on the voltage data detected by the voltage sensor 15. In the present embodiment, the supply side controller 14 calculates, as the inter-resonance coil distance, the offset amount between the axis of the primary side resonance coil 13 and the axis of the secondary side resonance coil 21, or an axis offset amount. The axis offset amount refers to the offset amount between the central axis of the primary side resonance coil 13 and the central axis of the secondary side resonance coil 21 in a direction perpendicular to the axial direction of the resonance coils 13, 21. The supply side controller 14 determines whether the primary side resonance coil 13 and the secondary side resonance coil 21 are in a proper positional relationship based on the axis offset amount, and sends the determination result to the charging controller 25. The charging controller 25 controls the informing section 27 based on the determination result sent from the supply side controller 14.

The memory 14b of the supply side controller 14 stores, as a map, data representing the relationship between the voltage of the primary coil 12 and the axis offset amount at a plurality of previously set values of the remaining battery level of the secondary battery 24. "A plurality of previously set values of the remaining battery level" refers to the remaining battery level of the secondary battery 24 at the start of charging. In the present embodiment, the previously set values include the remaining battery level in the state where the secondary battery 24 needs to be charged, and the remaining battery level in the state where the vehicle 30 has traveled to a charging station from the remaining battery level requiring charging. The data is obtained through experiments in advance.

During charging of the secondary battery 24, the supply side controller 14 controls the AC power source 11 such that an AC current having a proper frequency that corresponds to the inter-resonance coil distance is supplied to the primary coil 12. The proper frequency refers to a frequency for the inter-resonance coil distance. When the relationship between the input impedance of the resonance system 28 and the frequency of the AC current output from the AC power source 11 is plotted on a graph, the proper frequency is in a range between the local maximum point and the local minimum point of the input impedance. The frequency at which the power transmission efficiency is the highest at the resonance system 28 is defined as the resonance frequency.

Figure 2:
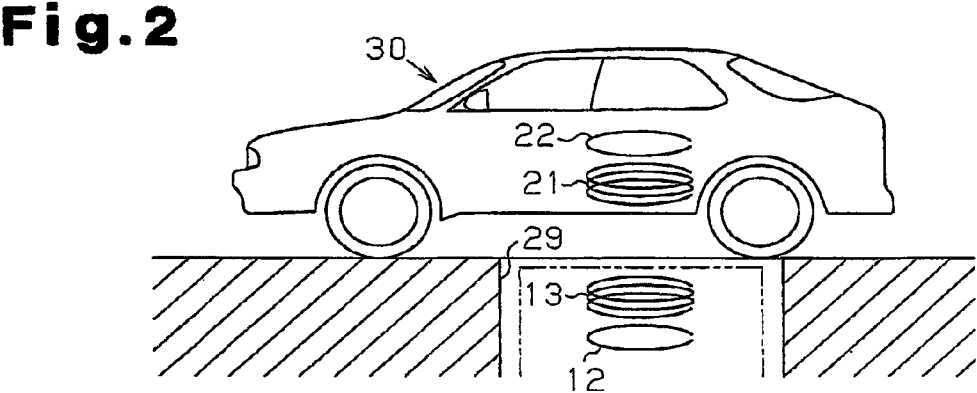
FIG. 2 is a schematic side view showing the relationship between the primary side resonance coil and the secondary side resonance coil when a vehicle is stopped at a charging position.

As shown in FIG. 2, the primary coil 12 and the primary side resonance coil 13 are arranged in a hole 29 in the ground. Specifically, the coils 12, 13 are arranged such that the central axes of the coils 12, 13 extend along a direction perpendicular to the ground surface, and that the primary side resonance coil 13 is located above the primary coil 12. The opening of the hole 29 is covered by an unillustrated cover so as not to hinder the movement of the vehicle 30.

Figure 3:
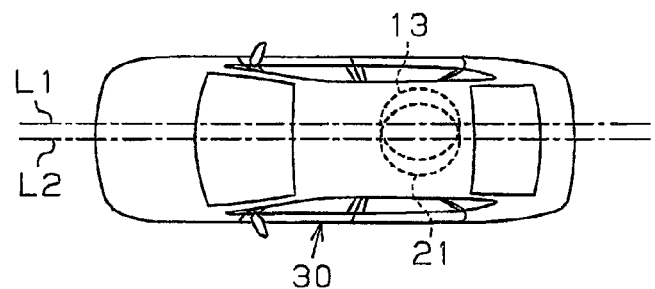
FIG. 3 is a schematic plan view of FIG. 2.

As shown in FIGS. 2 and 3, the secondary side resonance coil 21 and the secondary coil 22 are arranged at a substantial center in the widthwise direction at the bottom of the vehicle 30, and near the rear of the vehicle 30. The coils 12, 13 are arranged such that the central axes of the coils 21, 22 extend along the up-down direction of the vehicle, and that the secondary side resonance coil 21 is located below the secondary coil 22.

An operation of the non-contact power transmission apparatus configured as described above will now be described.

When the remaining battery level of the secondary battery 24 is lowered to a predetermined level, the secondary battery 24 needs to be charged. When charging the secondary battery 24, the vehicle 30 needs to be parked (stopped) at the charging position at which the primary side resonance coil 13 of the supply side equipment 10 is located. To efficiently charge the secondary battery 24, the vehicle 30 needs to be parked such that the axis offset amount between the primary side resonance coil 13 and the secondary side resonance coil 21 is within a predetermined range. The axis offset amount is, for example, a distance between a straight line L1, which perpendicular to the central axis of the primary side resonance coil 13, and a straight line L2, which is perpendicular to the central axis of the secondary side resonance coil 21 and parallel with the straight line L1, as shown in FIG. 3.

Figure 4:
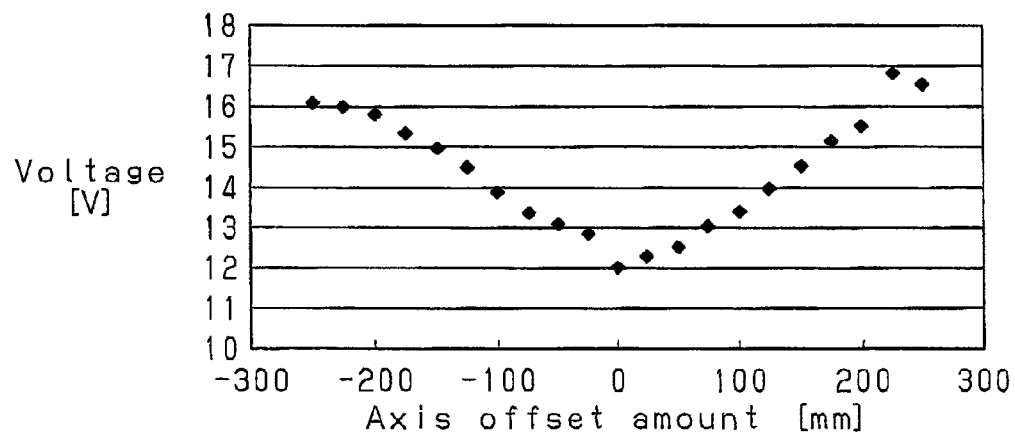
FIG. 4 is a graph showing the relationship between the offset amount of axis of the resonance coils and the voltage of the primary coil.
Figure 5:
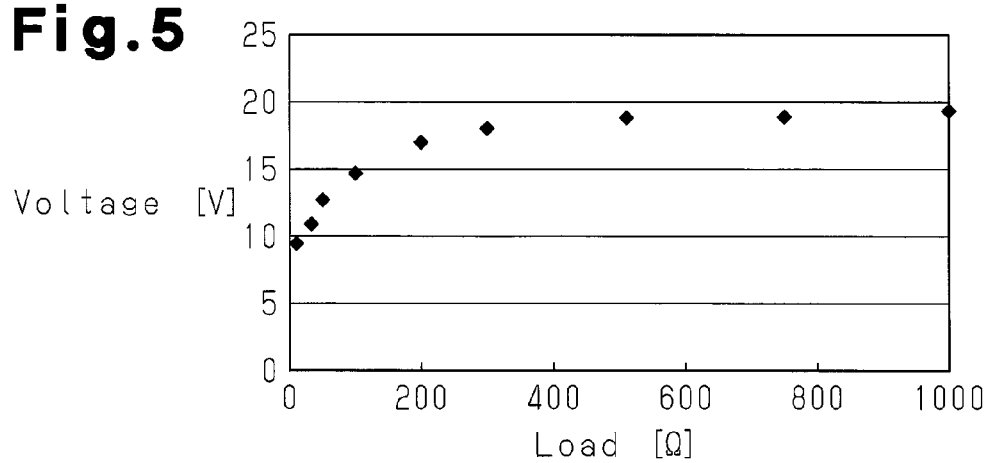
FIG. 5 is a graph showing the relationship between the impedance of the load and the voltage of the primary coil when the distance between the resonance coils is constant.

In the resonance system 28, when the distance along the axial direction between the primary side resonance coil 13 and the secondary side resonance coil 21 and the impedance of the load are constant, the voltage of the resonance system 28, that is, the voltage at the ends of the primary coil 12, and the axis offset amount of the resonance coils 13, 21 have a certain relationship as shown in FIG. 4. Therefore, when the voltage at the ends of the primary coil 12 is detected, the axis offset amount is obtained. At this time, the AC power source 11 is set as described below. That is, the AC power source 11 is set such that the output voltage of the AC power source 11 has a predetermined value (for example, 10 Vpp) in a state where the primary coil 12 is not connected to the AC power source 11 (output open state) or in a state where a specific fixed load (for example, a load having an impedance of 50Ω) is connected to the AC power source 11. This setting is referred to as initial setting. Without changing the initial setting, the AC power source 11 is connected to the primary coil 12, and the voltage at the ends of the primary coil 12 (the voltage of the resonance system 28) is measured. The AC power source 11 and the primary coil 12 do not need to be disconnected from each other every time the initial setting is determined. For example, it may be configured such that the output voltage of the AC power source 11 becomes equal to the predetermined value (for example, 10 Vpp) with the AC power source 11 connected to the primary coil 12, immediately before the voltage of the ends of the primary coil 12 is measured. Also, in the resonance system 28, if the distance along the axial direction between the primary side resonance coil 13 and the secondary side resonance coil 21 is constant, the voltage at the ends of the primary coil 12 and the impedance of the load has the relationship shown in FIG. 5. In the present embodiment, since the distance along the axial direction between the primary side resonance coil 13 and the secondary side resonance coil 21 is constant, the axis offset amount can be obtained from the measurement result of the voltage at the ends of the primary coil 12 based on the graph shown in FIG. 4. FIGS. 4 and 5 show one example in which the diameters of the primary coil 12, the primary side resonance coil 13, the secondary side resonance coil 21, and the secondary coil 22 are approximately 300 mm.

When the vehicle 30 is moved to the charging position, the supply side controller 14 activates the AC power source 11 and inputs the output signal of the voltage sensor 15 in response to a signal indicating that the vehicle 30 is to be moved to the charging position from the vehicle 30. After the initial setting of the AC power source 11 is completed, an AC voltage having the resonance frequency is supplied from the AC power source 11 to the primary coil 12, so that a magnetic field is generated at the primary coil 12. The magnetic field generated at the primary coil 12 is enhanced by magnetic field resonance of the primary side resonance coil 13 and the secondary side resonance coil 21, and the electromagnetic induction of the enhanced magnetic field of the secondary side resonance coil 21 generates power at the secondary coil 22. The generated power is supplied to the charging device 23.

The supply side controller 14 calculates the axis offset amount based on the voltage at the ends of the primary coil 12 measured by the voltage sensor 15 and the remaining battery level of the secondary battery 24 sent from the charging controller 25. Also, based on the calculation result of the axis offset amount, the supply side controller 14 determines whether the primary side resonance coil 13 and the secondary side resonance coil 21 are in a proper positional relationship, for example, whether the axis offset amount is in a predetermined range, and sends the data of the determination result to the charging controller 25. The charging controller 25 controls the informing section 27 based on the data. That is, if the primary side resonance coil 13 and the secondary side resonance coil 21 are in a proper positional relationship, a blue LED is lit to inform of the proper positional relationship. If the resonance coils 13, 21 are not in a proper positional relationship, a red LED is lit to inform of the improper positional relationship. The driver of the vehicle 30 stops the vehicle 30 at a proper charging position by referring to the state of the informing section 27.

After the vehicle 30 is parked at the proper charging position, the charging controller 25 starts controlling the switching element of the charging device 23, so that the secondary battery 24 starts being charged. The AC voltage output to the primary coil 12 by the AC power source 11 generates a magnetic field at the primary coil 12. The magnetic field generated at the primary coil 12 is enhanced by magnetic field resonance of the primary side resonance coil 13 and the secondary side resonance coil 21, and the electromagnetic induction of the enhanced magnetic field of the secondary side resonance coil 21 generates power at the secondary coil 22. The generated power is supplied to the charging device 23. The AC voltage supplied to the charging device 23 is rectified by the rectifier circuit, and is then raised to a voltage value suitable for charging the secondary battery 24. The secondary battery 24 is thus charged by the raised voltage. The charging controller 25 determines whether the charging is completed, for example, based on the output signal of the battery level sensor 26 and the time elapsed from when the voltage of the secondary battery 24 reaches a predetermined voltage. When determining that the charging is completed, the charging controller 25 sends a charging completion signal to the supply side controller 14. When receiving the charging completion signal, the supply side controller 14 controls the AC power source 11 to terminate the power transmission.

The present embodiment provides the following advantages.

(1) The non-contact power transmission apparatus includes the AC power source 11, the primary coil 12 to which an AC voltage from the AC power source 11 is applied, the primary side resonance coil 13, the secondary side resonance coil 21, and the secondary coil 22, to which the load (the charging device 23 and the secondary battery 24) is connected. The non-contact power transmission apparatus further includes the voltage measuring section (the voltage sensor 15), which measures the voltage at the ends of the primary coil 12, and the distance calculating section (the supply side controller 14), which calculates the inter-resonance coil distance based on the voltage measured by the voltage measuring section. Therefore, it is possible to determine whether the distance between resonance coils is suitable for efficiently carrying out power transmission without providing a dedicated sensor for measuring the distance between the resonance coils. Power transmission is thus prevented from being carried out in a state that is not suitable for efficiently performing the power transmission.

(2) The distance calculating section (the supply side controller 14) calculates, as the inter-resonance coil distance, an offset amount between the axis of the primary side resonance coil 13 and the axis of the secondary side resonance coil 21. Therefore, the non-contact power transmission apparatus of the present embodiment is suitable for a configuration in which the AC power source 11, the primary coil 12, and the primary side resonance coil 13 are fixed, and the secondary side resonance coil 21, the secondary coil 22, and the load are movable along a direction perpendicular to the central axis of the primary side resonance coil 13 and the central axis of the secondary side resonance coil 21 which is maintained parallel with the central axis of the primary side resonance coil 13.

(3) The secondary side resonance coil 21, the secondary coil 22, and the load (the charging device 23 and the secondary battery 24) are mounted on the movable body (the vehicle 30). Also, the movable body has the informing section 27 that informs of whether the primary side resonance coil 13 and the secondary side resonance coil 21 are in a proper positional relationship based on the calculation result of the distance calculating section. Therefore, when the movable body is stopped at a position for being charged by the AC power source 11, the movable body can be stopped at the stopping position (charging position) that is suitable for charging the secondary battery 24.

(4) The non-contact power transmission apparatus is used in a system that contactlessly charges the secondary battery 24 mounted on the vehicle 30. The secondary side resonance coil 21 and the secondary coil 22 are mounted on the vehicle 30, and the secondary coil 22 is connected to the secondary battery 24 through the charging device 23 forming the load. The AC power source 11, the primary coil 12, and the primary side resonance coil 13 are provided in the supply side equipment 10, which contactlessly charges the secondary battery 24. Therefore, charging is carried out efficiently.

(5) The secondary side resonance coil 21 is provided at the bottom of the vehicle 30, and the primary coil 12 and the primary side resonance coil 13 of the supply side equipment 10 are located in the hole 29 formed in the ground. This makes it easy to secure a space for accommodating the primary coil 12 and the primary side resonance coil 13. Also, the vehicle 30 can reach the charging position either by advancing or reversing.

(6) The AC current output from the secondary coil 22 is not charged to the secondary battery 24 after simply being rectified by the rectifier circuit. Instead, after being rectified by the rectifier circuit, the voltage of the AC current is raised by the booster circuit to a voltage suitable for being charged to the secondary battery 24, before being charged to the secondary battery 24. This allows the secondary battery 24 to be further efficiently charged.

(7) The capacitors C1, C2 are connected to the ends of the primary side resonance coil 13 and the secondary side resonance coil 21. This allows the resonance frequency to be lowered without increasing the numbers of turns of the primary side resonance coil 13 and the secondary side resonance coil 21. If the resonant frequency is the same, the configuration with the capacitors C1, C2 connected to the primary side resonance coil 13 and the secondary side resonance coil 21 allows the primary side resonance coil 13 and the secondary side resonance coil 21 to be reduced in size compared to the configuration without the capacitors C1, C2.

A second embodiment of the present invention will now be described with reference to FIGS. 6 and 7. In the present embodiment, the direction along which the central axes of the primary coil 12, the primary side resonance coil 13, the secondary side resonance coil 21, and the secondary coil 22 is different from that in the first embodiment. In the present embodiment, the distance calculating section (the supply side controller 14) does not calculate the offset amount between the axes of the resonance coils, but calculates the distance in the axial direction between the primary side resonance coil 13 and the secondary side resonance coil 21. Like or the same reference numerals are given to those components that are like or the same as the corresponding components of the first embodiment and detailed explanations are omitted.

Figure 6:
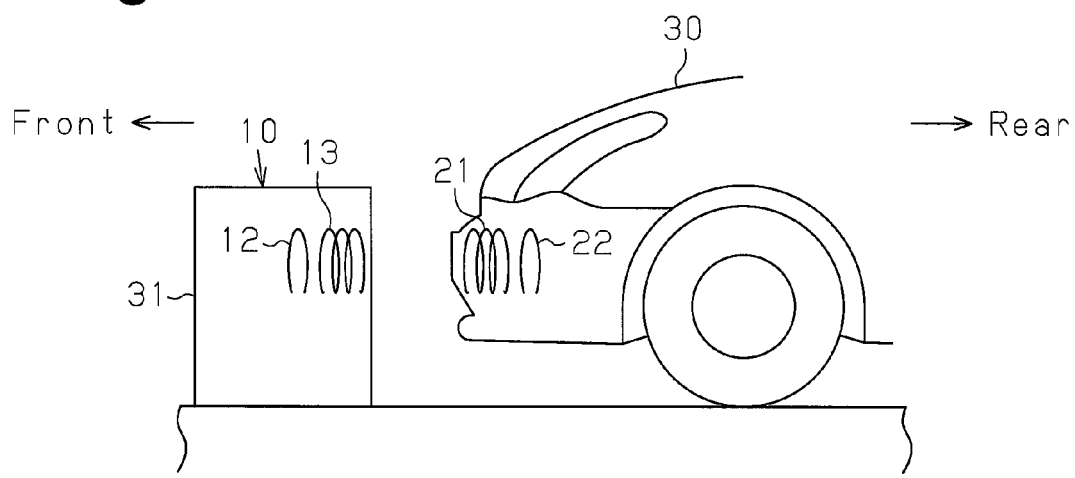
FIG. 6 is a diagram showing the relationship between a primary side resonance coil and a secondary side resonance coil according to a second embodiment of the present invention.
Figure 7:
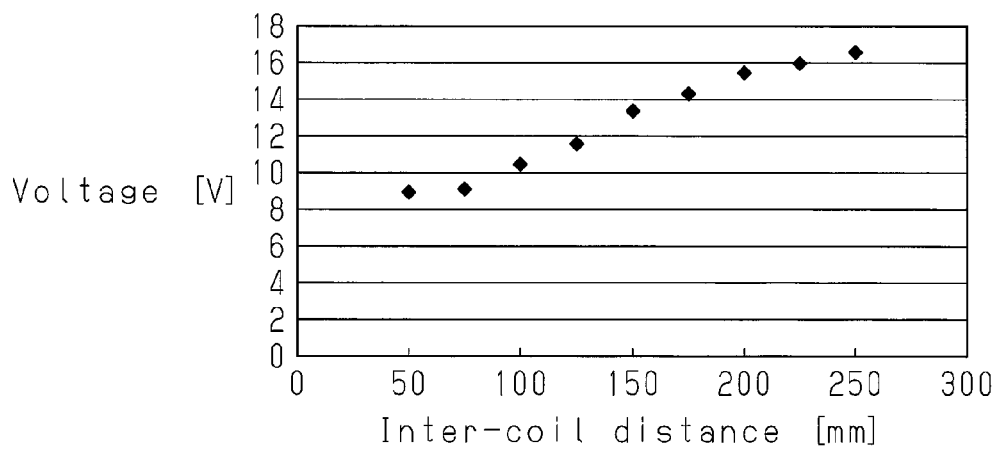
FIG. 7 is a graph showing the relationship between the distance between the resonance coils and the voltage of a primary coil.

As shown in FIG. 6, the primary coil 12 and the primary side resonance coil 13 are provided in an accommodation box 31 of the supply side equipment 10, which projects from the ground surface of a charging station. The primary coil 12 and the primary side resonance coil 13 are arranged such that the central axes extend along a horizontal direction relative to the ground surface. The secondary side resonance coil 21 and the secondary coil 22 are located in a front portion of the vehicle 30. The secondary side resonance coil 21 and the secondary coil 22 are arranged such that the central axes extend along the front-rear direction of the vehicle 30, and at the same height as the central axes of the primary coil 12 and the primary side resonance coil 13.

The memory 14b of the supply side controller 14 stores, as a map, data representing the relationship between the voltage at the ends of the primary coil 12 and the inter-resonance coil distance (the distance along the axial direction between the primary side resonance coil 13 and the secondary side resonance coil 21). In the present embodiment, the data includes the remaining battery level in the state where the secondary battery 24 needs to be charged, and the remaining battery level in the state where the vehicle 30 has traveled to a charging station from the remaining battery level requiring charging. For example, as shown in FIG. 7, the data is stored as a graph representing the relationship between the voltage at the ends of the primary coil 12 and the inter-resonance coil distance. The data is obtained through experiments in advance.

At a charging station, a guidance line is provided to guide the vehicle 30 to move to a position facing the supply side equipment 10 when charging the secondary battery 24. The driver advances the vehicle 30 along the guidance line so as to move the vehicle 30 to the charging position. When the vehicle 30 is moved to the charging position, the supply side controller 14 activates the AC power source 11 and inputs the output signal of the voltage sensor 15 in response to a signal indicating that the vehicle 30 is to be moved to the charging position from the vehicle 30. The supply side controller 14 calculates the inter-resonance coil distance (the distance along the axial direction between the primary side resonance coil 13 and the secondary side resonance coil 21) based on the voltage at the ends of the primary coil 12 measured by the voltage sensor 15 and the remaining battery level of the secondary battery 24 sent from the charging controller 25. Based on the calculation result, the supply side controller 14 determines whether the inter-resonance coil distance has a proper value. The supply side controller 14 sends the data of the determination result to the charging controller 25, which controls the informing section 27 based on the data. The driver of the vehicle 30 stops the vehicle 30 at a proper charging position by referring to the state of the informing section 27.

In addition to the advantages (1), (3), (6) and (7) of the first embodiment, the present embodiment has the following advantages.

(8) The distance calculating section (the supply side controller 14) calculates the distance along the axial direction between the primary side resonance coil 13 and the secondary side resonance coil 21. Therefore, the non-contact power transmission apparatus of the present embodiment is suitable for a configuration in which the AC power source 11, the primary coil 12, and the primary side resonance coil 13 are fixed, and the secondary side resonance coil 21, the secondary coil 22, and the load (the charging device 23 and the secondary battery 24) are movable with the primary side resonance coil 13 and the secondary side resonance coil 21 located on a common axis.

(9) The secondary side resonance coil 21 and the secondary coil 22 are arranged in a front portion of the vehicle 30 such that the central axes of the coils 21, 22 extend along the front-rear direction of the vehicle, and the primary coil 12 and the primary side resonance coil 13 of the supply side equipment 10 are accommodated in the accommodation box 31 projecting from the ground surface. Therefore, the hole 29 for accommodating the primary coil 12 and the primary side resonance coil 13 does not need to be formed in the ground. For vehicles 30 having different heights, the distances from the ground to the bottom of the vehicle are likely to be different. Thus, for the vehicles 30 having different heights, it is difficult to use a single value of the distance between the primary side resonance coil 13 of the supply side equipment 10 and the secondary side resonance coil 21 provided at the bottom of the vehicle body. The supply side equipment 10 thus needs to be changed for vehicles 30 having a different height. However, if the present embodiment is employed for vehicles 30 having different heights, the height of the central axes of the secondary side resonance coil 21 and the secondary coil 22 is set in accordance with the height of the central axes of the primary coil 12 and the primary side resonance coil 13 of the supply side equipment 10, so that the same supply side equipment 10 can be used for vehicles 30 having different heights.

The present invention is not limited to the above described embodiments, but may be modified as follows.

In the first embodiment, the position of the secondary side resonance coil 21 and the secondary coil 22 is not limited to a substantial center in the widthwise direction and near the rear of the vehicle 30. The position may be a substantial center in the widthwise direction and near the front of the vehicle 30 or a center portion in the front-rear direction of the vehicle 30. Alternatively, the position may be offset from the center in the widthwise direction.

In a configuration where the accommodation box 31 of the supply side equipment 10 projects from the ground surface as in the second embodiment, the secondary side resonance coil 21 and the secondary coil 22 may be provided near the rear of the vehicle 30. In this case, the driver needs to reverse the vehicle 30 so that it moves to the charging position.

Figure 8:
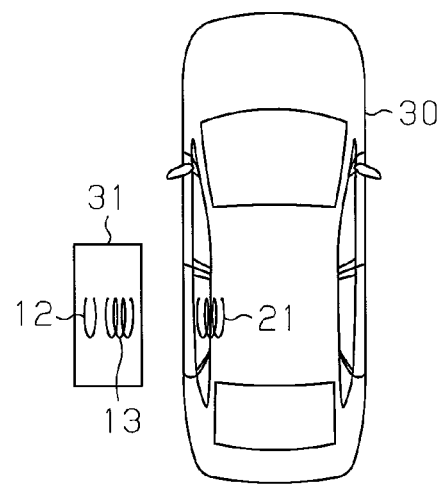
FIG. 8 is a diagram showing the relationship between a primary side resonance coil and a secondary side resonance coil according to a modified embodiment.
Figure 9:
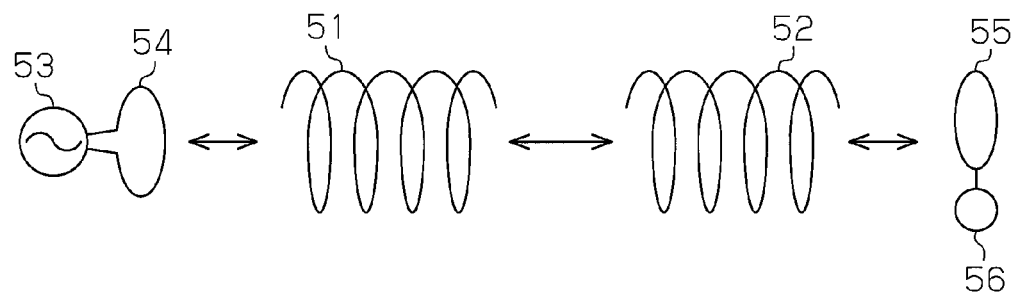
FIG. 9 is a diagram showing the configuration of a prior art non-contact power transmission apparatus.

In a configuration where the secondary side resonance coil 21 is arranged such that its central axis extends horizontally as in the second embodiment, the secondary side resonance coil 21 may be located in a side of the vehicle 30 such that the central axis extends along the widthwise direction of the vehicle 30 as shown in FIG. 8. In this case, a guidance line is provided in a charging station to guide the vehicle 30 to move to a position facing the supply side equipment 10 when charging the secondary battery 24. The driver advances the vehicle 30 along the guidance line so as to move the vehicle 30 to the charging position.

In the illustrated embodiments, the supply side controller 14 only has to calculate the inter-resonance coil distance based on the voltage at the ends of the primary coil 12 measured by the voltage measuring section (the voltage sensor 15). Specifically, for example, the supply side controller 14 may calculate the inter-resonance coil distance based on the voltage at the ends of the primary coil 12 measured by the voltage measuring section (the voltage sensor 15), even in a case where the vehicle 30 is moved such that the distance along the axial direction between the primary side resonance coil 13 and the secondary side resonance coil 21 is reduced when the secondary side resonance coil 21 and the primary side resonance coil 13 are not arranged on a common axis. In this case, a map or an expression that allows the secondary side resonance coil 21 and the primary side resonance coil 13 to be moved along a common axis is used. However, setting the allowable range to be narrow does not cause problem.

In the above described embodiments, the supply side controller 14 controls the AC power source 11 to stop power transmission when receiving a charging completion signal from the charging controller 25. Instead, the supply side controller 14 (determining section) may determine the time to stop the power transmission by calculating fluctuation of the impedance of the load based on the voltage at the ends of the primary coil 12 detected by the voltage sensor 15 during charging, and estimating the charging state of the secondary battery 24. For example, after the charging is started, the time to stop power transmission may be determined based on time elapsed from when the voltage at the ends of the primary coil 12 reaches a predetermined voltage.

In the illustrated embodiments, the movable body is not limited to the vehicle 30 operated by a driver, but may be an automated guided vehicle or a self-propelled robot or a portable electronic device having the secondary battery 24.

In the illustrated embodiments, the movable body is not limited to the one with a secondary battery, but may be an apparatus that is moved to a specified working position by transporting means such as a conveyor belt and has an electric motor. In this case, the motor serves as a load, and the movable body has a secondary side resonance coil 21 and a secondary coil 22. An AC power source 11, a primary coil 12, a primary side resonance coil 13, and a supply side controller 14 are provided at each working position. When the movable body is moved to a working position, power is supplied to the movable body by the AC power source 11. In this case, when charging the load (the motor), the supply side controller 14 may calculate fluctuation of the impedance of the load based on detection signals of the voltage sensor 15, and change the output frequency of the AC power source 11 to a proper frequency that corresponds to the load.

In the illustrated embodiments, instead of providing the informing section 27 in the vehicle 30, the informing section 27 may be provided in the supply side equipment 10. For example, the informing section 27 is provided at a position that is easily viewed by the driver of the vehicle 30, and the lighting of the informing section 27 is controlled by commands from the supply side controller 14. In this case, even though the informing section 27 is not provided in each vehicle 30, the driver can park the vehicle 30 at a proper charging position by checking the lighting state of the informing section 27 of the supply side equipment 10.

In the illustrated embodiments, when forming the coils 12, 13, 21, 22 by winding electric wires, the coils 12, 13, 21, 22 do not need to be cylindrical. For example, polygonal tubular shapes such as a triangular tubular shape, a rectangular tubular shape, and a hexagonal tubular shape, or an elliptic tubular shape may be employed. The shapes of the coils 12, 13, 21, 22 do not need to be symmetrical, but may be asymmetrical.

In the illustrated embodiments, the primary side resonance coil 13 and the secondary side resonance coil 21 do not need to be coils formed by cylindrically winding electric wires, but may be formed by spirally winding electric wires on a single plane such that the circumferential length changes progressively. In this case, since the entire coils 13, 21 are flat, the axial lengths of the coils 13, 21 are reduced.

In the illustrated embodiments, the coils 12, 13, 21, and 22 may be configured such that an electric wire is closely wound so that each turn contacts the adjacent turn, or may be configured such that the electric wire is wound with a space between each adjacent pair of turns.

In the illustrated embodiments, the coils 12, 13, 21, and 22 do not need to be formed to have the same diameter. For example, the primary side resonance coil 13 and the secondary side resonance coil 21 may have the same diameter, while the primary coil 12 and the secondary coil 22 may have different diameters. Alternatively, the primary coil 12 and the secondary coil 22 may have diameters different from those of the resonance coils 13, 21.

What is claimed:

1. A non-contact power transmission apparatus comprising:
    an AC power source;
    a primary coil to which an AC voltage of the AC power source is applied;
    a primary side resonance coil;
    a secondary side resonance coil;
    a secondary coil to which a load is connected;
    a voltage measuring section that measures the voltage of the primary coil; and
    a distance calculating section that calculates the distance between the primary side resonance coil and the secondary side resonance coil based on the voltage measured by the voltage measuring section.

2. The apparatus according to claim 1, wherein the distance calculating section calculates the distance along an axial direction between the primary side resonance coil and the secondary side resonance coil.

3. The apparatus according to claim 1, wherein the distance calculating section calculates the offset amount between the central axis of the primary side resonance coil and the central axis of the secondary side resonance coil in a direction perpendicular to the axial direction of the primary side resonance coil and the secondary side resonance coil.

4. The apparatus according to claim 1, wherein the secondary side resonance coil, the secondary coil, and the load are mounted on a movable body.

5. The apparatus according to claim 1, wherein the secondary side resonance coil, the secondary coil, and the load are mounted on a vehicle,
    wherein the load includes a charging device and a secondary battery,
    wherein the secondary side resonance coil and the secondary coil are arranged such that the central axis of the secondary side resonance coil and the central axis of the secondary coil each extend along the front-rear direction of the vehicle, and
    wherein the primary coil and the primary side resonance coil are arranged such that the central axis of the primary coil and the central axis of the primary side resonance coil each extend along a horizontal direction relative to the ground surface.

6. The apparatus according to claim 1, wherein the secondary side resonance coil, the secondary coil, and the load are mounted on a vehicle,
    wherein the load includes a charging device and a secondary battery,
    wherein the secondary side resonance coil and the secondary coil are arranged such that the central axis of the secondary side resonance coil and the central axis of the secondary coil each extend along the up-down direction of the vehicle, and
    wherein the primary coil and the primary side resonance coil are arranged such that, when the vehicle is parked at a charging position, the primary coil and the primary side resonance coil are located below the vehicle, and the central axis of the primary coil and the central axis of the primary side resonance coil each extend along a direction perpendicular to the ground surface.

7. The apparatus according to claim 1, further comprising an informing section that informs of whether the primary side resonance coil and the secondary side resonance coil are in a proper positional relationship based on a calculation result of the distance calculating section.

8. A non-contact power transmission apparatus comprising:
    an AC power source;
    a primary coil to which an AC voltage of the AC power source is applied;
    a primary side resonance coil;
    a secondary side resonance coil;

a secondary coil to which a load is connected;
a voltage measuring section that measures the voltage of the primary coil; and
a determining section that determines the state of the load based on the voltage measured by the voltage measuring section.

9. The apparatus according to claim 8,
wherein the determining section is configured to evaluate an impedance value of the load based on the voltage measured by the voltage measuring section.

\* \* \* \* \*